UNITED STATES PATENT OFFICE.

M. MATTSON, OF BOSTON, MASSACHUSETTS.

IMPROVEMENT IN THE TREATMENT OF CAOUTCHOUC.

Specification forming part of Letters Patent No. 23,103, dated March 1, 1859.

*To all whom it may concern:*

Be it known that I, MORRIS MATTSON, of Boston, in the county of Suffolk and State of Massachusetts, have invented a new and Improved Mode of Manufacturing India-Rubber Fabrics; and I do hereby declare that the following is a full and exact description thereof.

The nature of my invention or improvement is the substitution of compounds of oxides of iron and manganese, known as "ochers," "Venetian" and "Indian" reds, and "ochrey salts," for oxides of iron and carbonate of lead, which have heretofore been used in mixture with sulphur for vulcanizing india-rubber.

It is well-known that a mixture of carbonate of lead or oxide of lead has been hitherto used with sulphur as an addition to india-rubber, for the purpose of vulcanizing it by the subsequent application of heat. The carbonate and oxide of lead have certain relations to sulphur which interfere with their use in this connection. Either of these bodies abstracts a portion of the sulphur from the quantity mixed with the rubber, in consequence of the strong affinity which lead shows for sulphur. The carbonate of lead gives off carbonic acid, and its oxide, or any oxide of lead, added with it, passes its oxygen to the sulphur, with which it combines, forming one or more sulphur acids, while sulphide of lead also is formed and remains in the mixture. Now, it often happens that these two compounds of sulphur, after some months' exposure, becomes acidified and act chemically on the organic matter of the rubber itself, rendering it porous and brittle. Means have been resorted to having in view the removal of the acids by neutralization, and magnesia and oxide of zinc have been added to india-rubber for this purpose with only partial success. The equivalent weight of oxide of lead being seven times the weight of that of sulphur, much oxide is required to neutralize only a small quantity of the acids, and this effect is further prevented by the compactness of the oxide. Mechanically, too, the use of the carbonate or oxide of lead is attended by serious objection. Each particle of either compound has a scale form, and these scales, assembled in elastic fabrics, tend to cut and destroy the fibers with which they are in contact.

I have discovered that the finely-divided compounds of iron and oxygen in the ochers, reds, &c., have much less action on sulphur in rubber than either carbonate or oxide of lead has, which property permits me to use less sulphur in manufacturing goods without preventing vulcanization. Very little of the sulphur present in the mixture acts on the iron compounds, which often remain unchanged in color, and when any action does take place the resulting sulphide, in presence of air and moisture, decomposes into sulphur and oxide of iron, no acid or sulphate whatever being formed. Hence there is no chemical action exerted on the rubber from this cause by subsequent exposure. These impure iron compounds—such as Venetian red, Indian red, red and brown ochers—are among the finest powders known, and the particles of these powders are very minute grains of a rounded form, usually—a form which permits the elastic action of rubber without risk of destroying or cutting the fibers. The fineness of the particles of these materials allows me to use much more in weight of them than of lead compounds to produce the same degree of rigidity without loss of strength or elasticity. This additional weight and the consumption of a material of very low cost economically enable me to reduce the expense of manufacturing india-rubber largely in many of its applications.

To show more distinctly the distinction between my improvement and the course at present pursued, I place the proportions of ingredients used in manufacturing rubber-fabrics.

| *Standard Formula.* | *Improvement Formula.* |
|---|---|
| India-rubber........25 pounds. | India-rubber........25 pounds. |
| White-lead..........10 pounds. | Venetian red or ocher.20 pounds. |
| Sulphur.............48 ounces. | Sulphur.............37 ounces. |
| Heated to 260° Fahrenheit. | Heated to 210° or 220° Fahrenheit. |

But the most important feature of my improvement relates to the superiority of the fabrics uniformly obtained, their greater elasticity and strength, with durability on exposure in damp situations. These qualities are partly due to the removal of risk of injury to the fibers of the rubber by vulcanizing at a low temperature permitted by the mixture and partly to the absence of any acid-forming body.

To enable those skilled in art to manufacture my improved compound, I proceed to give the following true and full description thereof:

Take of india-rubber, good quality, twenty-five pounds; dry Venetian red or fine ocher, twenty pounds; washed, dry, pure sulphur, thirty-seven ounces. Grind and incorporate in the usual manner. After forming the articles intended, vulcanize at a temperature not exceeding 220° Fahrenheit. If a black color is desired, substitute half a pound of lamp or cork black for half a pound of the ocher, and the same for the other colors and pigments.

The composition here described is my basis or normal compound, which I vary to suit every requirement by the addition of more or less ocher and other substances. Thus, in order to form the compound used in manufacturing my packing for steam apparatus, which I call "iron packing," I add to the above mixture so much of a mixture composed of equal parts of Venetian red and finely-ground soapstone as will give it the desired firmness when vulcanized. In making fabrics composed in part of either animal or vegetable fibers or leather shreds I add these substances to my basis compound.

I am aware that ochers have been used for tinting compounds of rubber, sulphur, and white lead, and that oxide of zinc and magnesia, with oxide of lead, have been used in india-rubber fabrics or compositions, and I disclaim the use of these, and substitute for them in the manufacture of india-rubber compositions of various degrees of elasticity and solidity the ochers above named. My improvement rests on the action, chemical and mechanical, of the oxides and other compounds of iron with more or less manganese, as found in the Venetian and Indian reds, red, brown, and yellow ochers, and boles or earths containing finely-divided oxide of iron as an addition to sulphur in this manufacture.

In carrying out my improvement there is to be employed a proportion of not less than two parts, by weight, of ocher or oxide of iron to five parts, by weight, of the india-rubber. The composition thus made is without any of the compounds of lead in mixture with the sulphur. Although ocher or Venetian red may have been employed heretofore in india-rubber compounds, it has only been used in small quantities and for coloring or tinting, and always, I believe, in connection with the oxide of lead or the lead compounds, causing the material to be a composition of india-rubber, sulphur, oxide of lead, and ocher. From this my india-rubber manufacture or composition differs materially, as it contains no lead or its oxide, and a very large quantity of the ocher, or much more than is sufficient for coloring, the whole being sufficient to take the place of the lead. Now, ocher may have been employed in considerable quantity with gutta-percha for coloring it; but still I am not aware of it ever having been employed without the lead compound or the equivalent thereof being present. Furthermore, it will be seen that by my invention the vulcanizing process can be carried on at a very low temperature in comparison to that generally required when oxide of lead is used with the sulphur and rubber. Here I gain an important advantage.

I do not claim any invention described in the patent of N. Hayward, dated February 24, 1839, and especially I do not claim the combination of caoutchouc and sulphur, broadly; but What, therefore, I claim is—

My new or improved india-rubber composition, or manufacture as made, in manner substantially as specified, without any of the oxide of lead, but of caoutchouc, sulphur, and one or more ochers, or an earth or earths containing one or more finely-divided oxides of iron, and employed in a quantity much greater than necessary for simply affording color to the compound, the quantity being essentially in the proportions as hereinbefore stated, or such as will afford the economical and useful results, as explained.

MORRIS MATTSON.

Witnesses:
  BENJ. F. COOKE,
  JOHN MASKINS.